Dec. 6, 1960

L. I. VARNEY ET AL 2,962,817

SCREW-THREAD GAUGE

Filed Oct. 2, 1958

L. I. VARNEY
and
STANLEY FARROW
INVENTORS,

BY

ATTORNEYS.

and the micrometer spindle.

2,962,817

SCREW-THREAD GAUGE

Linwood I. Varney, 1614 Hampton Road, and Stanley Farrow, 1902 Evergreen St., both of Huntsville, Ala.

Filed Oct. 2, 1958, Ser. No. 765,009

3 Claims. (Cl. 33—167)

(Granted under Title 35, U.S. Code (1952), sec. 266)

The invention described herein may be manufactured and used by or for the Government for governmental purposes without the payment of any royalty thereon.

This invention relates to a screwthread gauge for measuring the pitch diameter of screwthreads. A presently used gauge of this type, comprising a micrometer and three separate wires for insertion in the spaces between the threads, has the defect of being very cumbersome and requiring first the installation of the wires in a cork or the like, and later the holding of a micrometer and the wire assembly by the use of both hands.

Thus there is a need for a gauge of this kind which can be easily operated with one hand. Also there is need for a gauge which will automatically adjust itself to the proper position between the threads, when the gauge contacts the threads. There is a further need for a screwthread contacting wire assembly which may be manufactured and sold as a separate unit and may be easily and quickly installed on a standard micrometer. Various sizes of such an assembly may be manufactured and sold, so that the user may select the size that is proper for measuring a particular screwthread and quickly install it on a micrometer.

Accordingly, an object of this invention is to provide a quickly assembled composite micrometer unit for the measurement of screwthreads.

Another object of this invention is to provide a gauge wherein the contacts will automatically adjust themselves upon contact with the screwthreads. A further object is to provide a wire assembly which is easily fitted on a micrometer or similar device, so that it can be operated with one hand.

Another object of the invention is to provide a thread-contacting wire assembly that may be resiliently attached to a micrometer.

A further object is to provide a wire assembly which may be fabricated from a single piece of wire.

The foregoing and other objects of this invention will become more fully apparent from the following detailed description of a preferred embodiment of the invention and from the accompanying drawings, in which.

Figure 1:
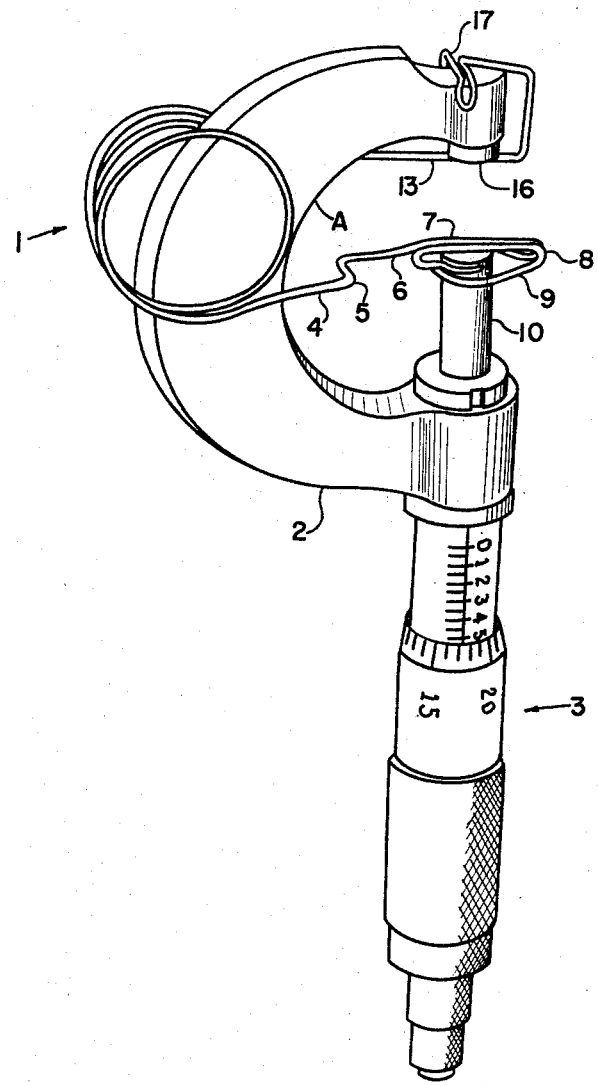
Figure 1 is a partial perspective view of the screwthread gauge.
Figure 2:
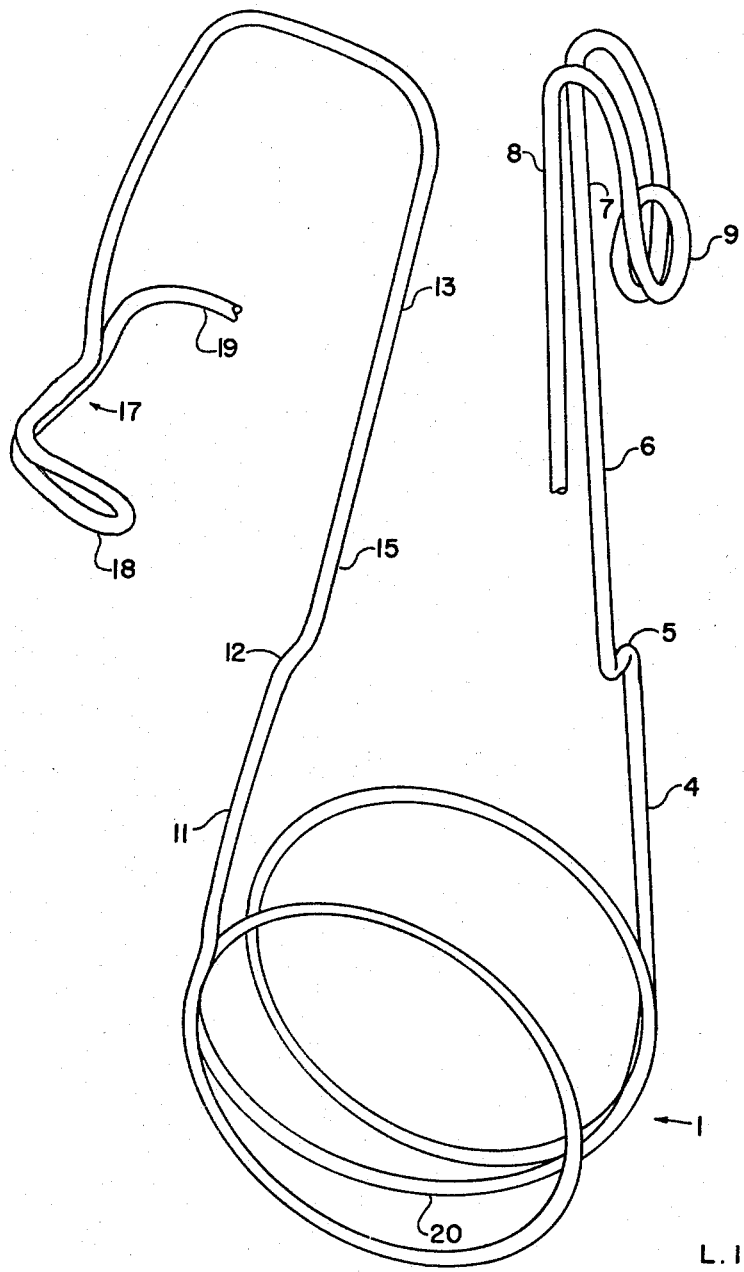
Figure 2 is an enlarged view of the wire assembly.

In the drawings, the numeral 1 designates a double loop, adapted to be clipped to a frame 2 of a micrometer 3 or similar device.

An upper generally straight arm or element 4 extends from the top of the double loop, or like arrangement, 1 and forms a wire centering bend, or angle 5, which is positioned inside the arc A formed by the frame 2.

The straight portion 6 of the arm, integrally connected to the bend or angle 5 at one of the portions end and to the thread-contacting portion 7 at its other end, has a length adapted to fit in the space between the bend 5 and the micrometer spindle.

Figure 3:
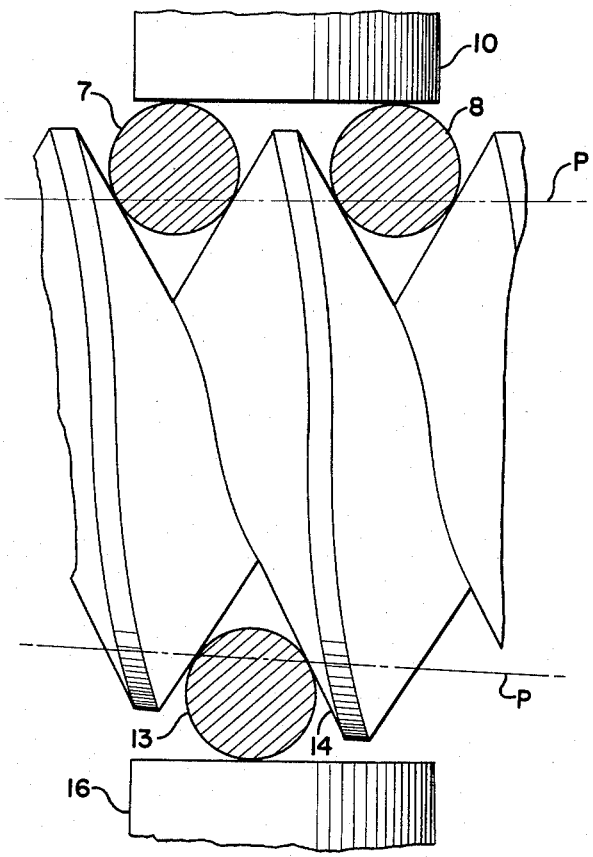
Figure 3 is an enlarged view showing the thread gauge in measuring contact with screwthreads.

Another thread-contacting portion 8 is parallel to thread-contacting portion 7; and the two contacting portions, together, engage both lateral surfaces of a portion of a screwthread that is being measured. This engagement is approximately at or near the pitch diameter P (Fig. 3) of the screwthread.

Contact elements 7 and 8, and integral therewith, there is a loop 9 that in use is positioned around the micrometer spindle 10.

On the other side of loop 1 from arm 4 there is another generally straight arm or element 11 which is connected to a second wire-centering bend or angle 12 that also is positioned within arc A.

Wire-centering bends 5 and 12 are bent in opposite directions and are otherwise constructed and arranged so as to position the center between screwthread contacts 7 and 8 diametrically opposite a third thread contact 13.

The thread-contacting portion 13 engages the lateral side 14 of the portion of the screwthread that is being engaged by the thread-contacting portions 7 and 8. This engagement by portion 13 is also approximately near the pitch diameter P (Fig. 3) of the screwthread.

One end of the thread-contacting portion 13 is integrally connected to wire-centering bend or angle 12 by means of a straight portion 15, adapted to fit in the space between the bend 12 and the micrometer anvil 16.

The other end of the thread-contacting portion 13 is integrally connected to an anvil-supported element 17 positioned opposite the anvil face. This element comprises two substantially parallel spaced portions or members 18 and 19 which span the micrometer frame.

In fabrication of the wire assembly it is preferable to utilize spring steel, since the assembly must have resilient properties. Also the thread contacts must be hard enough to retain their original size during continued use.

The operation of the thread gauge is as follows:

The double loop 1 is clipped to a frame 2 of a micrometer or similar device 3, with the upper arm 4 extending toward the spindle 10. Then the loop 9 is fitted around the spindle 10 with the thread contacts 7 and 8 engaging the face of the spindle, as shown in Figure 1.

The lower arms 11 and 15 extend toward the anvil 16. Portions 18 and 19 of the anvil supported element 17 are placed in position to span the micrometer frame 2 and thus place thread contact 13 in its proper position which is diametrically opposite the center of the opposite contacts 7 and 8.

The composite screwthread gauge, thus assembled, may now be used by one hand in measurement of a particular screwthread. If the screwthread is in a lathe this measurement may be made without taking the threaded element out of the machine.

The measurement of the distance between the closest surfaces of the thread contacts on opposite sides of the screw threaded element is read from the micrometer. This measurement is utilized in conjunction with a standard formula, which depends on the diameter of the particular wire contacts that have been selected for the measured screwthread, to determine the pitch diameter of the thread.

It is to be understood that the form of the invention, herein shown and described, is to be taken as a preferred embodiment, and that various changes in the shape, size and arrangement of parts may be resorted to without departing from the spirit of the invention, or the scope of the subjoined claims.

The following invention is claimed:

1. An article of manufacture comprising: Two interconnected, juxtaposed, substantially parallel, mounting loops of wire; a wire element connecting said loops in spaced arrangement; a wire portion connected to an end of each of said loops, one of said wire portions comprising parallel screw thread-contacting wire elements of a diameter suitable for insertion between the flanks of a screwthread and further comprising a looped portion connected to and spaced from said parallel screw thread-contacting wire elements and adapted to fit a micrometer spindle, the other of said wire portions comprising another wire element of the said diameter and further comprising two substantially parallel wire members that are spaced a substantial distance from said looped portion and adapted to connect said last-named wire element to a micrometer anvil; said interconnected loops and wire element comprising a resilient means tending to hold said looped portions and said pair of wire members spaced apart by said substantial distance but resiliently resisting increase in said substantial distance, said wire portions further comprising short pieces at angles to said wire elements and connecting said wire elements to the parts of said wire portions that are fixed to the end of said two loops, said angles and the lengths of said short pieces being adapted to place said thread-contacting wire elements in parallelism and in adjacent planes.

2. A unitary-wire assembly for fastening to a screwthread gauge comprising: two parallel, juxtaposed screwthread contacts; a loop connecting said two parallel contacts and adapted to connect said contacts to the movable spindle of a micrometer, said loop being constructed and arranged to position said contacts within the projected circle of and in contact with the face of said spindle, a third screw-threaded contact positioned diametrically opposite the center between said parallel contacts; two substantially parallel wire members adapted to connect said third contact in contiguous relation with the stationary anvil of a micrometer; and an integral, parallel double loop adapted to be resiliently connected to a micrometer frame; and wire portions provided with oppositely directed wire centering bends connecting said contacts to said double loop.

3. A composite gauge for measurement of the pitch diameter of a screwthread comprising a micrometer having first and second portions, the second of which is movable, in measurement, relative to the first portion; a unitary-wire assembly resiliently fastened to said micrometer comprising a pair of juxtaposed, substantially parallel loops of resilient wire arranged in generally helical form interconnected by a helical piece of resilient wire, said loops clamped to said first portion, a wire portion connected to each of said loops and perpendicular to the axis of said loops, said wire portions having oppositely directed wire-centering bends, a wire element connected to each of said bends, one of said wire elements comprising two contacts for insertion in grooved portions of said screwthread and a loop engaging said second portion of said micrometer for supporting said contacts in measuring position on said second portion of said micrometer, the other of said wire elements comprising a third contact, for insertion in a groove of said screwthread, which is diametrically opposite the center between said first mentioned contacts, said other wire element further comprising a U-shaped section for support of said third contact in measuring position on said first portion of said micrometer, said U-shaped section engaging two sides of said first portion of said micrometer and connected to a pair of members which are normal to said U-shaped section, said contacts being cylindrical and of a selected diameter suitable for the particular pitch diameter of the screwthread that is being measured.

References Cited in the file of this patent

UNITED STATES PATENTS

| | | |
|---|---|---|
| 1,402,567 | Byrne | Jan. 3, 1922 |
| 2,622,337 | Ross | Dec. 23, 1952 |
| 2,663,948 | Scully | Dec. 29, 1953 |
| 2,692,438 | Schneider | Oct. 26, 1954 |

FOREIGN PATENTS

| | | |
|---|---|---|
| 107,855 | Great Britain | July 19, 1917 |